(12) United States Patent
Hu et al.

(10) Patent No.: US 12,279,070 B2
(45) Date of Patent: Apr. 15, 2025

(54) METHOD FOR FRAME INTERPOLATION AND RELATED PRODUCTS

(71) Applicant: GUANGDONG OPPO MOBILE TELECOMMUNICATIONS CORP., LTD., Guangdong (CN)

(72) Inventors: Jie Hu, Guangdong (CN); Wenzhen Lin, Guangdong (CN)

(73) Assignee: GUANGDONG OPPO MOBILE TELECOMMUNICATIONS CORP., LTD., Guangdong (CN)

( * ) Notice: Subject to any disclaimer, the term of this patent is extended or adjusted under 35 U.S.C. 154(b) by 316 days.

(21) Appl. No.: 17/813,590

(22) Filed: Jul. 19, 2022

(65) Prior Publication Data

US 2022/0360736 A1 Nov. 10, 2022

Related U.S. Application Data

(63) Continuation of application No. PCT/CN2021/070143, filed on Jan. 4, 2021.

(30) Foreign Application Priority Data

Jan. 20, 2020 (CN) .......................... 202010065634.0

(51) Int. Cl.
*H04N 7/01* (2006.01)
*G06T 7/20* (2017.01)
(Continued)

(52) U.S. Cl.
CPC ............. *H04N 7/014* (2013.01); *G06T 7/20* (2013.01); *H04N 23/632* (2023.01); *H04N 23/951* (2023.01); *G06T 2207/10016* (2013.01)

(58) Field of Classification Search
CPC .... H04N 7/014; H04N 23/632; H04N 23/951; H04N 21/41407; H04N 21/4316;
(Continued)

(56) References Cited

U.S. PATENT DOCUMENTS 10,404,923 B1\* 9/2019 Pena .................. G06F 3/04817
2003/0016750 A1 1/2003 Cok
2009/0059074 A1\* 3/2009 Suematsu ...... H04N 21/440281
348/569

(Continued)

FOREIGN PATENT DOCUMENTS

CN 103248950 8/2013
CN 203313319 11/2013
(Continued)

OTHER PUBLICATIONS

Huang et al., "Correlation-Based Motion Vector Processing With Adaptive Interpolation Scheme for Motion-Compensated Frame Interpolation," IEEE Transactions on Image Processing, Apr. 2009, vol. 18, No. 4.

(Continued)

*Primary Examiner* — Nhan T Tran
(74) *Attorney, Agent, or Firm* — Hodgson Russ LLP (57) ABSTRACT

A method for frame interpolation and related products are provided. The method is applied to an electronic device including a camera. The method includes the following. On-screen display (OSD) data and first video data collected by the camera are obtained. Second video data is obtained by performing frame interpolation on the first video data. The second video data and the OSD data are displayed in a video window.

20 Claims, 7 Drawing Sheets

(51) Int. Cl.
*H04N 23/63* (2023.01)
*H04N 23/951* (2023.01)

(58) Field of Classification Search
CPC ... H04N 21/440245; H04N 21/440281; H04N 23/633; H04N 21/4223; H04N 23/81; G06T 7/20; G06T 2207/10016
See application file for complete search history.

(56) References Cited

U.S. PATENT DOCUMENTS

| | | | |
|---|---|---|---|
| 2009/0207183 A1 | 8/2009 | Matsuura | |
| 2009/0316798 A1* | 12/2009 | Mimar | G06T 1/20 |
| | | | 375/240.26 |
| 2015/0146097 A1* | 5/2015 | Izumi | H04N 21/440218 |
| | | | 348/447 |
| 2018/0315174 A1 | 11/2018 | Staranowicz et al. | |
| 2020/0137319 A1* | 4/2020 | Pena | H04N 5/2621 |

FOREIGN PATENT DOCUMENTS

| | | |
|---|---|---|
| CN | 108322650 | 7/2018 |
| CN | 108632666 | 10/2018 |
| CN | 108683852 | 10/2018 |
| CN | 109275011 | 1/2019 |
| CN | 109922231 | 6/2019 |
| CN | 110072135 | 7/2019 |
| CN | 110121071 | 8/2019 |
| CN | 111225150 | 6/2020 |

OTHER PUBLICATIONS

EPO, Extended European Search Report for EP Application No. 21744632.7, May 10, 2023.
IPI, Office Action for IN Application No. 202227047134, Nov. 16, 2022.
CNIPA, First Office Action for CN Application No. 202010065634.0, Feb. 24, 2021.
CNIPA, Notification to Grant Patent Right for CN Application No. 202010065634.0, Jul. 2, 2021.
WIPO, International Search Report and Written Opinion for International Application No. PCT/CN2021/070143, Apr. 16, 2021.
EPO, Extended European Search Report for EP Application No. 21744632.7, Aug. 16, 2023.

* cited by examiner

METHOD FOR FRAME INTERPOLATION AND RELATED PRODUCTS

CROSS-REFERENCE TO RELATED APPLICATION(S)

This application is a continuation of International Application No. PCT/CN2021/070143, filed Jan. 4, 2021, which claims priority to Chinese Patent Application No. 202010065634.0, filed Jan. 20, 2020, the entire disclosures of which are incorporated herein by reference.

TECHNICAL FIELD

This application relates to the field of electronic technology, and particularly to a method for frame interpolation and related products.

BACKGROUND

With the popularization of electronic devices (e.g., mobile phones, tablet computers, etc.), the electronic device can support more and more applications and its functions are becoming more and more powerful. The electronic device is developing in a diversified and personalized direction and has become an indispensable electronic product in people's daily life.

At present, when a camera of the electronic device is turned on, a shot picture of the camera, such as a preview picture or a live video picture, will be displayed. When the camera moves with the electronic device, lagging may occur in pictures. Therefore, how to avoid lagging of the shot picture of the camera has become a problem to-be-solved.

SUMMARY

In a first aspect, implementations of the disclosure provide a method for frame interpolation. The method is applied to an electronic device including a camera. The method includes the following. On-screen display (OSD) data and first video data collected by the camera are obtained. Second video data is obtained by performing frame interpolation on the first video data. The second video data and the OSD data are displayed in a video window.

In a second aspect, implementations of the disclosure provide an electronic device. The electronic device includes a camera, a display screen, and a chip for frame interpolation coupled with the camera and the display screen. The chip for frame interpolation is configured to: obtain OSD data and first video data collected by the camera; obtain second video data by performing frame interpolation on the first video data; and control the second video data and the OSD data to be displayed in a video window of the display screen.

In a third aspect, implementations of the disclosure provide a non-transitory computer-readable storage medium. The computer-readable storage medium stores computer programs. The computer programs include program instructions which, when executed by a processor, cause the processor to execute all or part of the operations of the method in the first aspect of implementations of the disclosure.

BRIEF DESCRIPTION OF THE DRAWINGS

In order to describe technical solutions of implementations of the disclosure or the related art more clearly, the following will give a brief description of accompanying drawings used for describing the implementations or the related art. Apparently, accompanying drawings described below illustrate merely some implementations. Those of ordinary skill in the art can also obtain other accompanying drawings based on these accompanying drawings without creative efforts.

DETAILED DESCRIPTION

In order for those skilled in the art to better understand technical solutions of the disclosure, the technical solutions of implementations of the disclosure will be described clearly and completely with reference to accompanying drawings of the implementations. Apparently, implementations described below are merely some implementations, rather than all implementations of the disclosure. All other implementations obtained by those of ordinary skill in the art based on these implementations without creative efforts shall fall within the protection scope of the disclosure.

The terms "first", "second", and the like used in the specification, the claims, and the accompany drawings of the disclosure are used to distinguish different objects rather than describe a particular order. The terms "include", "comprise", and "have" as well as variations thereof are intended to cover non-exclusive inclusion. For example, a process, method, system, product, or device including a series of steps/operations or units is not limited to the listed steps/operations or units, on the contrary, it can optionally include other steps/operations or units that are not listed; alternatively, other steps/operations or units inherent to the process, method, product, or device can be included either.

The term "implementation" referred to herein means that particular features, structures, or properties described in conjunction with the implementations may be defined in at least one implementation of the disclosure. The phrase "implementation" appearing in various places in the specification does not necessarily refer to the same implementation or an independent/alternative implementation that is mutually exclusive with other implementations. Those skilled in the art will understand expressly and implicitly that an implementation described herein may be combined with other implementations.

"Electronic device" in implementations of the disclosure may include various handheld devices with wireless communication functions (e.g., smart phones, tablet computers, etc.), on-board devices (e.g., navigators, on-board refrigerators, on-board vacuum cleaners, etc.), wearable devices (e.g., smart watches, smart bracelets, wireless earphones, augmented reality (AR)/virtual reality (VR) devices, smart glasses, etc.), computing devices, or other processing devices connected to a wireless modem, as well as various forms of user equipment (UE), mobile stations (MS), terminal devices, etc. For convenience of description, the above-mentioned devices are collectively referred to as electronic devices.

Hereinafter, implementations of the disclosure will be described in detail.

Implementations of the disclosure provide a method for frame interpolation. The method is applied to an electronic device including a camera. The method includes the following. On-screen display (OSD) data and first video data collected by the camera are obtained. Second video data is obtained by performing frame interpolation on the first video data. The second video data and the OSD data are displayed in a video window.

Implementations of the disclosure provide an electronic device. The electronic device includes a camera, a display screen, and a chip for frame interpolation coupled with the camera and the display screen. The chip for frame interpolation is configured to: obtain OSD data and first video data collected by the camera; obtain second video data by performing frame interpolation on the first video data; and control the second video data and the OSD data to be displayed in a video window of the display screen.

Implementations of the disclosure provide a non-transitory computer-readable storage medium. The computer-readable storage medium stores computer programs. The computer programs include program instructions which, when executed by a processor, cause the processor to execute all or part of the operations of the above method for frame interpolation.

Figure 1A:
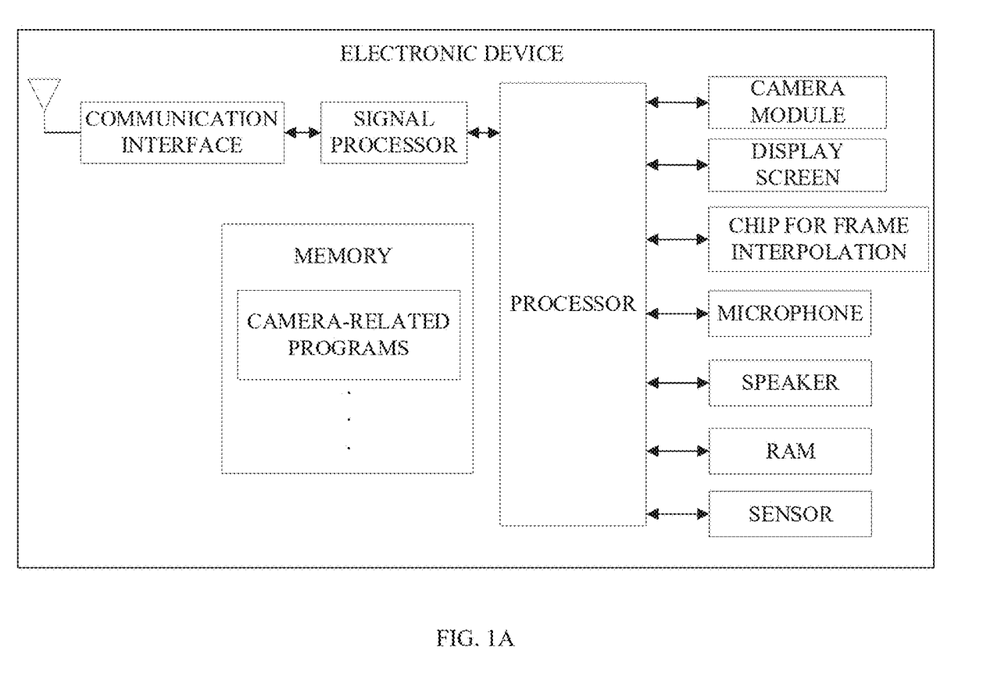
FIG. 1A is a schematic structural diagram illustrating an electronic device provided in implementations of the disclosure.

As illustrated in FIG. 1A, FIG. 1A is a schematic structural diagram illustrating an electronic device provided in implementations of the disclosure. The electronic device includes a processor, a memory, a signal processor, a communication interface, a display screen, a speaker, a microphone, a random access memory (RAM), a chip for frame interpolation, a camera module, a sensor, and the like. The memory, the signal processor, the display screen, the speaker, the microphone, the RAM, the camera module, the sensor, and the chip for frame interpolation are connected with the processor, and the communication interface is connected with the signal processor.

The display screen may be a liquid crystal display (LCD), an organic light-emitting diode (OLED) or an inorganic light-emitting diode, an active matrix/organic light-emitting diode (AMOLED) panel, etc.

The camera module may include an ordinary camera, and may also include an infrared camera, which is not limited herein. The camera may be a front camera or a rear camera, which is not limited herein.

The sensor may include at least one of a light sensor, a gyroscope, an infrared (IR) sensor, a fingerprint sensor, a pressure sensor, or the like. The light sensor, also known as an ambient light sensor, is configured to detect brightness of ambient light. The light sensor may include a photosensitive element and an analog-to-digital converter. The photosensitive element is configured to convert a collected optical signal into an electrical signal. The analog-to-digital converter is configured to convert the electrical signal into a digital signal. Optionally, the light sensor may further include a signal amplifier. The signal amplifier can amplify the electrical signal converted by the photosensitive element and output it to the analog-to-digital converter. The photosensitive element may include at least one of a photodiode, a phototransistor, a photoresistor, or a silicon photocell.

The processor is a control center of the electronic device. The processor uses various interfaces and lines to connect various parts of the whole electronic device. By running or executing software programs and/or modules stored in the memory and calling data stored in the memory, the processor can perform various functions of the electronic device and process data, so as to monitor the electronic device as a whole.

The processor may be integrated with an application processor (AP) and a modem processor. The application processor mainly handles with an operating system, a user interface, and an application. The modem processor mainly handles with wireless communications. It can be understood that, the modem processor may not be integrated into the processor.

The processor may include a central processing unit (CPU) and a graphics processing unit (GPU). The CPU is one of main devices of an electronic computer and a core accessory of the computer. The CPU is mainly configured to parse computer instructions and process data of computer software. The CPU is a core component of the computer and is responsible for reading an instruction, decoding the read instruction, and executing the decoded instruction. The CPU mainly includes two parts, that is, a controller and an arithmetic unit, and also includes a cache memory and a data and/or control bus that realizes a connection with the cache memory. Three core components of the electronic computer are the CPU, a memory, and an input/output device. Functions of the CPU mainly include processing an instruction, executing an operation, controlling time, and processing data. The GPU, also known as a display core, a visual processor, and a display chip, is a kind of microprocessor that specializes in image and graphics-related operations on a personal computer, a workstation, a game console, and some mobile devices (e.g., tablet computers, smart phones). The GPU makes a graphics card less dependent on the CPU, and can execute part of works originally executed by the CPU, especially in three-dimensional (3D) graphics processing. Core technologies used by the GPU may include hardware T&L (geometry transform and lighting processing), cubic environment materiality map and vertex blending, texture compression and bump map, dual texture four-pixel 256-bit rendering engine, etc., and the hardware T&L can be said to be iconic of GPU.

The memory is configured to store software programs and/or modules. The processor executes various functional applications of the electronic device and processes data by running the software programs and/or modules stored in the memory. The memory mainly includes a program storage area and a data storage area. The program storage area may store the operating system, software programs required by at least one function, and the like. The data storage area may store data created according to the use of the electronic device, and the like. In addition, the memory may include a high-speed RAM, and may also include a non-transitory memory, such as at least one of a magnetic disk memory device, flash memory device, or other transitory solid-state memory devices.

The chip for frame interpolation is configured to add one or more frames between every two frames of images (in the following, "frame" for short) of original displayed images, to shorten display time of each image, which can improve a frame rate of video display of the electronic device, solve problems of a video such as flickering and trailing, eliminate edge blurring of a fast-moving image, and correct "illusion" caused by persistence of human vision, thereby effectively improving image stability. The chip for frame interpolation may be a graphics card, for example, an iris chip.

Based on the electronic device described above with reference to FIG. 1A, the following functions can be realized. The chip for frame interpolation is configured to: obtain on-screen display (OSD) data and first video data collected by the camera, when the camera is turned on; perform frame interpolation on the first video data to obtain second video data; and control the second video data and the OSD data to be displayed in a video window of the display screen.

In a possible example, the chip for frame interpolation configured to obtain the OSD data and the first video data collected by the camera is specifically configured to: obtain the first video data collected by the camera through a first video data pipeline; and obtain the OSD data through a second video data pipeline.

In a possible example, the chip for frame interpolation configured to perform frame interpolation on the first video data to obtain the second video data is configured to: perform frame interpolation on the first video data to obtain the second video data, on condition that first attribute information of the first video data satisfies a first preset condition. The chip for frame interpolation configured to control the second video data and the OSD data to be displayed in the video window of the display screen is configured to: control the second video data and the OSD data to be displayed in the video window of the display screen, on condition that second attribute information of the OSD data satisfies a second preset condition.

In a possible example, the first attribute information includes a first layer name and a first layer format, the second attribute information includes a second layer name and a second layer format. The chip for frame interpolation is further configured to: determine that the first attribute information of the first video data satisfies the first preset condition, on condition that the first layer name is a video layer or the first layer format is a YUV format; and determine that the second attribute information of the OSD data satisfies the second preset condition, on condition that the second layer name is an OSD layer or the second layer format is an RGB format.

In a possible example, the chip for frame interpolation configured to perform frame interpolation on the first video data to obtain the second video data is specifically configured to: perform a motion vector computation on the first video data to obtain a target vector; and perform frame interpolation on the first video data according to the target vector to obtain the second video data.

In a possible example, the chip for frame interpolation configured to perform the motion vector computation on the first video data to obtain the target vector is specifically configured to: perform motion detection on the first video data to obtain multiple motion detection points; for each of the multiple motion detection points, obtain a point motion vector of the motion detection point, to obtain multiple point motion vectors; and determine any of the point motion vectors as the target vector, on condition that the multiple point motion vectors are the same.

In a possible example, the chip for frame interpolation configured to perform frame interpolation on the first video data according to the target vector to obtain the second video data is specifically configured to: determine a target video frame rate corresponding to a target video segment to which any two adjacent video images in the first video data belongs; determine a target frame-interpolation quantity n corresponding to the target video frame rate according to a preset correspondence between video frame rates and frame-interpolation quantities, where n is a positive integer; perform motion compensation according to the target vector to obtain n frame-interpolation images; and insert the n frame-interpolation images between the any two adjacent video images to obtain the second video data.

In a possible example, the chip for frame interpolation configured to perform frame interpolation on the first video data to obtain the second video data is configured to: divide the first video data into multiple video segments; for each of the multiple video segments, determine a video frame rate corresponding to the video segment, to obtain multiple video frame rates; and perform frame interpolation on the first video data to obtain the second video data, on condition that a difference between a maximum video frame rate and a minimum video frame rate among the multiple video frame rates is smaller than a preset threshold.

In a possible example, the chip for frame interpolation configured to perform frame interpolation on the first video data to obtain the second video data is configured to: detect existence of a pop-up box in the video window; and perform frame interpolation on the first video data to obtain the second video data, in response to absence of the pop-up box in the video window.

In a possible example, the chip for frame interpolation configured to perform frame interpolation on the first video data to obtain the second video data is configured to: divide the first video data into multiple video segments; for each of the multiple video segments, determine a video frame rate corresponding to the video segment, to obtain multiple video frame rates; detect existence of a pop-up box in the video window, on condition that a difference between a maximum video frame rate and a minimum video frame rate among the multiple video frame rates is smaller than a preset threshold; and perform frame interpolation on the first video data to obtain the second video data, in response to absence of the pop-up box in the video window.

As can be seen, when the camera is turned on, the electronic device described in implementations of the disclosure obtains, with the chip for frame interpolation, the OSD data and the first video data collected by the camera. The electronic device performs, with the chip for frame interpolation, frame interpolation on the first video data to obtain the second video data. The electronic device displays the second video data and the OSD data in the video window of the display screen. As such, frame interpolation is performed on the first video data, which can improve smoothness of video pictures and avoid introduction of a negative display effect caused by the OSD data.

Figure 1B:
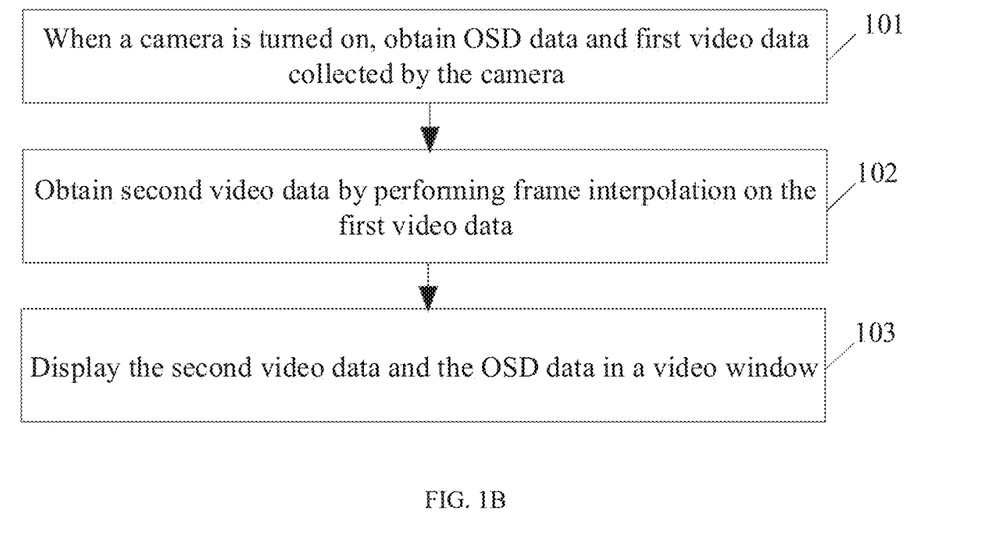
FIG. 1B is a schematic flowchart illustrating a method for frame interpolation provided in implementations of the disclosure.

Referring to FIG. 1B, FIG. 1B is a schematic flowchart illustrating a method for frame interpolation provided in implementations of the disclosure. The method is applied to the electronic device illustrated in FIG. 1A, where the electronic device includes a camera. The method for frame interpolation includes the following.

101, when the camera is turned on, OSD data and first video data collected by the camera are obtained.

102, frame interpolation is performed on the first video data to obtain second video data.

103, the second video data and the OSD data are displayed in a video window.

An application scenario of implementations of the disclosure is a specific shooting scenario. Specifically, the specific shooting scenario may be a scenario where a dynamic preview picture is displayed when shooting with the camera. In this scenario, OSD data such as a focus frame will appear in the preview picture displayed in the video window. Alternatively, the specific shooting scenario may also be a shooting scenario of a live video. In this scenario, OSD data such as graphics, icons, and controls will appear in the live picture displayed in the video window. In the shooting scenario of these implementations, the camera is turned on, and a display screen needs to display the first video data collected by the camera. Since shaking of the camera may cause the preview picture or a shot picture of a live video to lag, the OSD data and the first video data collected by the camera can be obtained, and video frame interpolation is adopted to avoid lagging of the preview picture or the live video.

The OSD data herein refers to a specific glyph or graphic displayed in the video window. The content of the OSD data varies with an application scenario. For example, the OSD data may be at least one of a pause button, a fast-forward button, a TV station logo in a video playback scenario, a user icon in a live video scenario, a focus frame in a shot preview picture, or a special effect component. In this solution, the OSD data may include at least one of a focus frame in a shot preview picture, a special effect component in a shot picture in a live video scenario, a pause button, etc., which is not limited herein.

In this solution, when displaying the first video data on a video interface, in addition to displaying the first video data, the electronic device may also display other display contents other than the first video data, that is, both a video layer and an OSD layer are displayed in the video window.

Optionally, operations at 101 of obtaining the OSD data and the first video data collected by the camera include the following operations.

11, the first video data collected by the camera is obtained through a first video data pipeline.

12, the OSD data is obtained through a second video data pipeline.

The first video data pipeline herein may be a vision interface group (VIG) data pipeline. The VIG data pipeline refers to a data pipeline provided for video data in a YUV format. The VIG data pipeline can be used to transmit the first video data and image data in an RGB format. The second video data pipeline herein may be a VIG data pipeline or a space division multiple access (SDMA) data pipeline. The SDMA data pipeline refers to a data pipeline provided for image data in an RGB format, and can be used to transmit image data in an RGB format. YUV is a color model typically used as part of a color image pipeline, and commonly used to describe file-formats (pixel formats) that are encoded using YCbCr.

In an implementation, the chip for frame interpolation obtains the first video data through the first video data pipeline, and obtains the OSD data through the second video data pipeline. For example, the first video data is transmitted to a first layer mixer (LM) through a first VIG data pipeline, then to a first local tone mapping (LTM) layer, then to a first display post processing (DSPP) unit, then to a first display stream compression (DSC), and finally to the chip for frame interpolation through a first display serial interface (DSI) bus and a first mobile industry processor interface (MIPI) bus. The OSD data is transmitted to a second LM through a second VIG data pipeline, then to a second LTM layer, then to a second DSPP unit, then to a second DSC, and finally to the chip for frame interpolation through a second DSI bus and a second MIPI bus. Alternatively, the OSD data is transmitted to a third LM via an SDMA data pipeline, and then to the chip for frame interpolation from the third LM.

Figure 1C:
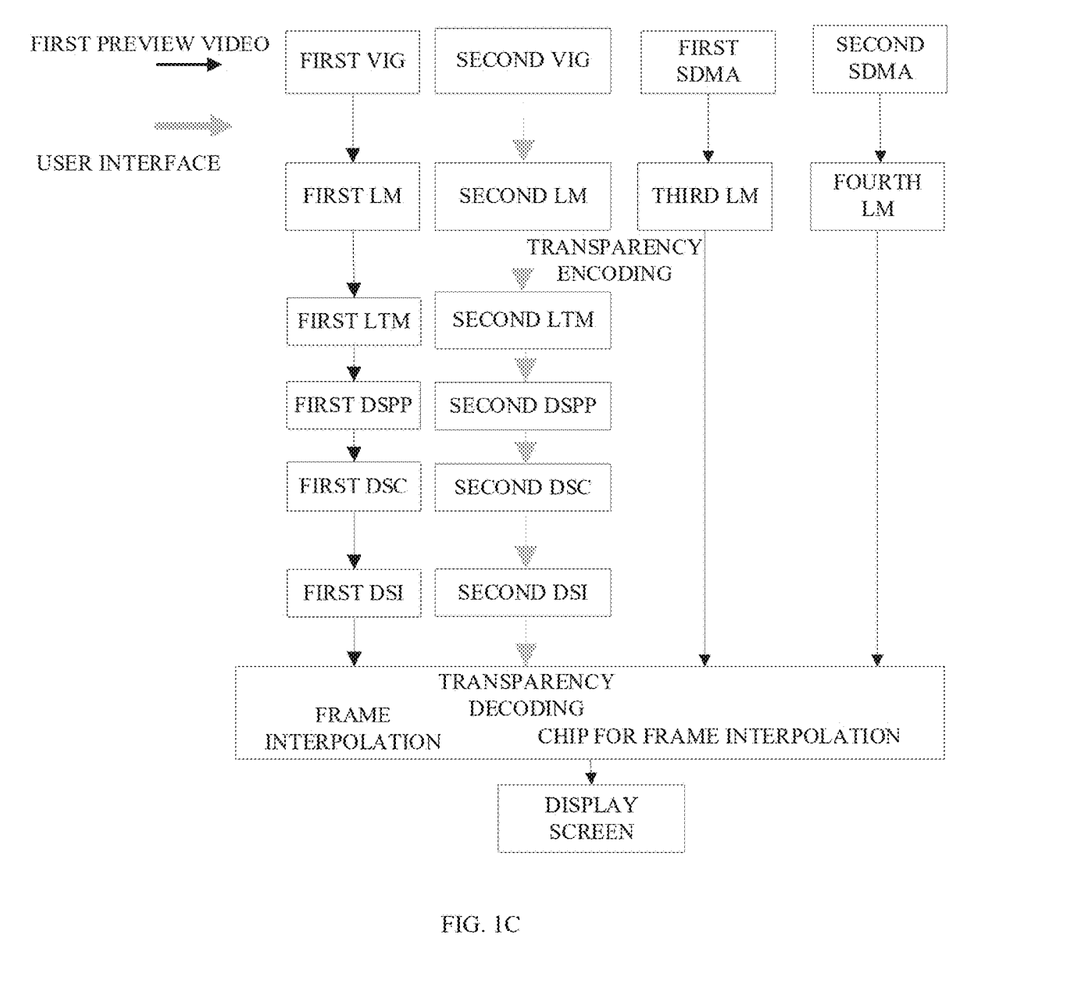
FIG. 1C is a schematic flowchart illustrating obtaining of first video data and on-screen display (OSD) data provided in implementations of the disclosure.

For example, referring to FIG. 1C, FIG. 1C is a schematic flowchart illustrating obtaining of the first video data and the OSD data provided in implementations of the disclosure. As illustrated in FIG. 1C, the first video data is transmitted to the first LM through the first VIG data pipeline, then to the first LTM, then to the first DSPP unit, then to the first DSC, and finally to the chip for frame interpolation through the first DSI. Finally, the first video data is subjected to frame interpolation by the chip for frame interpolation to obtain second video data, and the second video data obtained after frame interpolation is sent to the display screen. The OSD data is transmitted to the second LM through the second VIG data pipeline, to encode transparency information of the OSD data, specifically, to convert the transparency information of the OSD data into RGB information, the RGB information is transmitted to the second LTM, then to the second DSPP unit, then to the second DSC, and finally to the chip for frame interpolation through the second DSI. Finally, the RGB information is decoded by the chip for frame interpolation to obtain original RGB information and the transparency information of the OSD data. The transparency information and the original RGB information are transmitted to the display screen, and the OSD data can be displayed in the video window according to the transparency information. As such, the first video data and the OSD data can be transmitted to the chip for frame interpolation through two data pipelines respectively.

Frame interpolation is performed on the first video data to obtain the second video data. Movement of the camera may cause lagging of a video picture of the camera, which in turn affects a display effect of the video picture. If frame interpolation is performed on the video picture including the first video data and the OSD data, frame interpolation on the OSD data will have a negative effect. Therefore, frame interpolation can be performed only on the first video data to eliminate motion jitter and motion trailing in the first video data in a moving scenario, to obtain the second video data obtained after frame interpolation, thereby improve clarity of a video picture.

Optionally, operations at 102 of performing frame interpolation on the first video data to obtain the second video data include the following operations. 1201, if first attribute information of the first video data satisfies a first preset condition, frame interpolation is performed on the first video data to obtain the second video data. Operations at 103 of displaying the second video data and the OSD data in the video window include the following operations. 1202, if second attribute information of the OSD data satisfies a second preset condition, the second video data and the OSD data are displayed in the video window.

The first attribute information herein may include a first layer name and a first layer format, and the second attribute information herein may include a second layer name and a second layer format.

In implementations of the disclosure, before performing frame interpolation on the first video data, the first video data may be recognized first. If the first attribute information of the first video data satisfies the first preset condition, the first video data is determined to be video data which requires frame interpolation. The OSD data may also be recognized. If the second attribute information of the OSD data satisfies the second preset condition, the OSD data is determined to be data which does not require frame interpolation and can be directly transmitted to the display screen for display. In this implementation, the first attribute information carried by the first video data and the second attribute information carried by the OSD data can be recognized to distinguish the first video data from the OSD data, and different processing can be performed respectively on the first video data and the OSD data.

Optionally, before operations at 102, the method further includes the following operations.

1203, if a first layer name is a video layer or a first layer format is a YUV format, the first attribute information of the first video data is determined to satisfy the first preset condition.

1204, if a second layer name is an OSD layer or a second layer format is an RGB format, the second attribute information of the OSD data is determined to satisfy the second preset condition.

The first attribute information may include the first layer name and the first layer format, and the second attribute information may include the second layer name and the second layer format. If the first layer name is a video layer or the first layer format is a YUV format (e.g., a YCBCR_420 format), the first video data is determined to be video data requiring frame interpolation. If the second layer name is an OSD layer or the second layer format is an RGB format, for example, a focus frame of a shot picture has an RGBA8888 format when shooting with the camera, the OSD data is determined to be data which does not require frame interpolation and can be directly transmitted to the display screen for display.

Optionally, operations at 102 of performing frame interpolation on the first video data to obtain the second video data include the following operations.

21, a motion vector computation is performed on the first video data to obtain a target vector.

22, frame interpolation is performed on the first video data according to the target vector to obtain the second video data.

The target vector herein may represent a motion displacement of a moving object in the first video data. The target vector of the moving object can be determined, and frame interpolation can be performed on the first video data according to the determined target vector to obtain the second video data. For example, the first video data contains a moving soccer ball, a target vector of the moving soccer ball can be determined, and frame interpolation can be performed on the first video data according to the determined target vector to obtain the second video data.

Optionally, operations at 21 of performing the motion vector computation on the first video data to obtain the target vector include the following operations.

2101, motion detection is performed on the first video data to obtain multiple motion detection points.

2102, for each of the multiple motion detection points, a point motion vector of the motion detection point is obtained, to obtain multiple point motion vectors.

2103, if the multiple point motion vectors are the same, any of the point motion vectors is determined as the target vector.

In implementations of the disclosure, motion detection can be performed on the first video data to determine the multiple motion detection points, where the multiple motion detection points are multiple feature points of a moving object in the first video data, and then for each of the multiple motion detection points, the point motion vector of the motion detection point is obtained, to obtain the multiple point motion vectors. If the multiple point motion vectors are the same, any of the point motion vectors is determined as the target vector.

Optionally, operations at 22 of performing frame interpolation on the first video data according to the target vector to obtain the second video data include the following operations.

2201, a target video frame rate corresponding to a target video segment to which any two adjacent video images in the first video data belongs is determined.

2202, a target frame-interpolation quantity n corresponding to the target video frame rate is determined according to a preset correspondence between video frame rates and frame-interpolation quantities, where n is a positive integer.

2203, motion compensation is performed according to the target vector to obtain n frame-interpolation images.

2204, the n frame-interpolation images are inserted between the any two adjacent video images to obtain the second video data.

The motion compensation refers to a method of describing a difference between adjacent frames/images (where the term "adjacent" means adjacent in a coding relationship), specifically describing how each small block in a previous frame moves to a certain position of a current frame. This method can be used in video compression or used by a video codec to reduce spatial redundancy in video sequences, and can also be used in motion interpolation.

In an implementation, the first video data includes multiple video images, and the first video data can be divided into multiple video segments, and for each of the video segments, a video frame rate of the video segment can be determined. Therefore, in this solution, the target video frame rate corresponding to the target video segment to which any two adjacent video images belongs can be determined. Considering that the larger the video frame rate, the clearer a video, and the smaller the video frame rate, the less clear the video, the correspondence between video frame rates and frame-interpolation quantities can be set in advance, and the target frame-interpolation quantity n corresponding to the target video frame rate can be determined according to the correspondence. Moreover, the motion compensation can be performed according to the target vector to obtain the n frame-interpolation images. Specifically, the target vector is divided into (n+1) offset vectors according to the target frame-interpolation quantity n, and then the n frame-interpolation images are determined according to the (n+1) offset vectors and the two adjacent video images. Finally, the n frame-interpolation images are inserted between the any two adjacent video images to obtain the second video data. As such, frame interpolation can be performed more accurately according to the frame rate, which can improve smoothness of video data in the video window.

Optionally, in implementations of the disclosure, the method further includes the following operations. 1021, the first video data is divided into multiple video segments. 1022, for each of the multiple video segments, a video frame rate corresponding to the video segment is determined, to obtain multiple video frame rates. Operations at 102 of performing frame interpolation on the first video data to obtain the second video data include the following operations. 1023, if a difference between a maximum video frame rate and a minimum video frame rate among the multiple video frame rates is smaller than a preset threshold, frame interpolation is performed on the first video data to obtain the second video data.

Considering that stability of the frame rate will affect an effect of frame interpolation, and if frame rate changes greatly, frame interpolation will cause blur in images, in implementations of the disclosure, stability of the video frame rate of the first video data is detected before frame interpolation is performed on the first video data. Specifically, the first video data is divided into the multiple video segments, and the video frame rate corresponding to each of the multiple video segments is determined to obtain the multiple video frame rates. If the difference between the maximum video frame rate and the minimum video frame rate among the multiple video frame rates is smaller than the preset threshold, it indicates that the multiple video frame rates have relatively small differences from one another, the frame rate of the first video data is relatively stable, and frame interpolation can be performed on the first video data. On the other hand, if the difference between the maximum video frame rate and the minimum video frame rate among the multiple video frame rates is greater than or equal to the preset threshold, it indicates that the frame rate of the first video data is not stable enough, and frame interpolation will not be performed on the first video data.

Optionally, in implementations of the disclosure, the method further includes the following operations.

1024, detect existence of a pop-up box in the video window.

1025, in response to absence of the pop-up box in the video window, frame interpolation is performed on the first video data.

In implementations of the disclosure, considering that when the pop-up box exists in the video window, performing frame interpolation on the first video data may affect a display effect of the pop-up box, existence of the pop-up box in the video window can be detected before performing frame interpolation on the first video data. If the pop-up box exists in the video window, frame interpolation on the first video data can be suspended. If no pop-up box exists in the video window, frame interpolation is performed on the first video data.

The second video data obtained after frame interpolation and the OSD data are displayed on a display screen. The smoothness of the second video data obtained after frame interpolation is higher than that of the first video data, and display of a focus frame in the video window will not affect a display effect of the second video data.

Figure 1D:
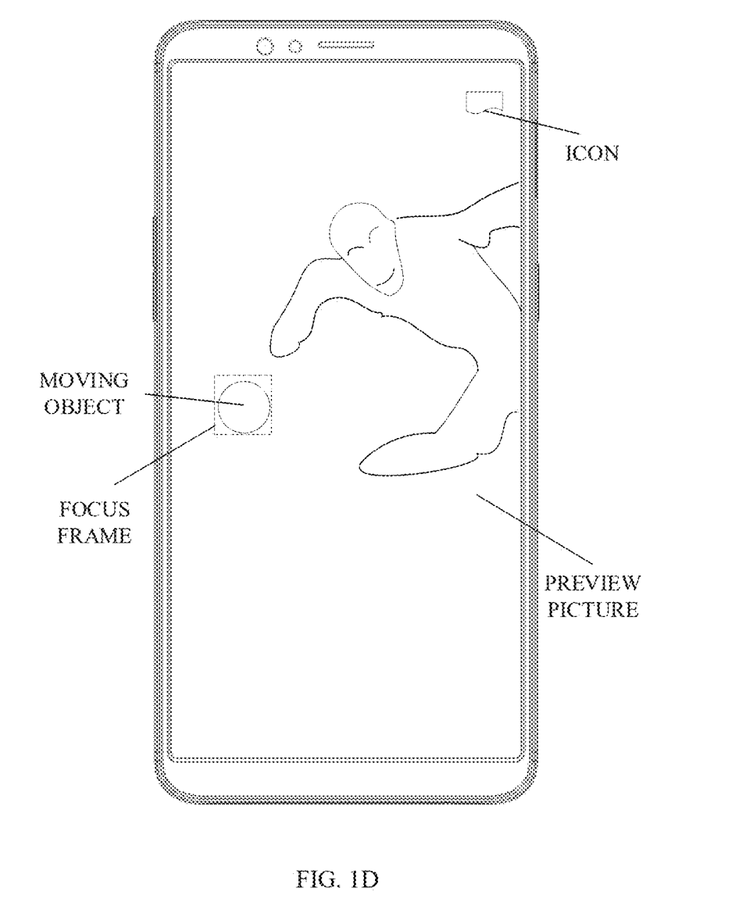
FIG. 1D is a demonstration schematic diagram illustrating displaying of second video data and OSD data provided in implementations of the disclosure.

Referring to FIG. 1D, FIG. 1D is a demonstration schematic diagram illustrating displaying of the second video data and the OSD data provided in implementations of the disclosure. When shooting with the camera, a preview picture includes the second video data obtained after frame interpolation and the OSD data (e.g., a focus frame, and an icon). The focus frame changes in the video window in response to a user's focusing operation, or the focus frame changes according to a position of a moving object obtained by the electronic device through object detection. The smoothness of the second video data obtained after frame interpolation is higher than that of the first video data, and display of the focus frame in the video window will not affect the display effect of the second video data.

As can be seen, according to the method for frame interpolation described in implementations of the disclosure, where the method is applied to the electronic device including the camera, the OSD data and the first video data collected by the camera are obtained when the camera is turned on; frame interpolation is performed on the first video data to obtain the second video data; the second video data and the OSD data are displayed in the video window. As such, frame interpolation is performed on the first video data, which can improve smoothness of video pictures and avoid introduction of a negative display effect caused by the OSD data.

Figure 2:
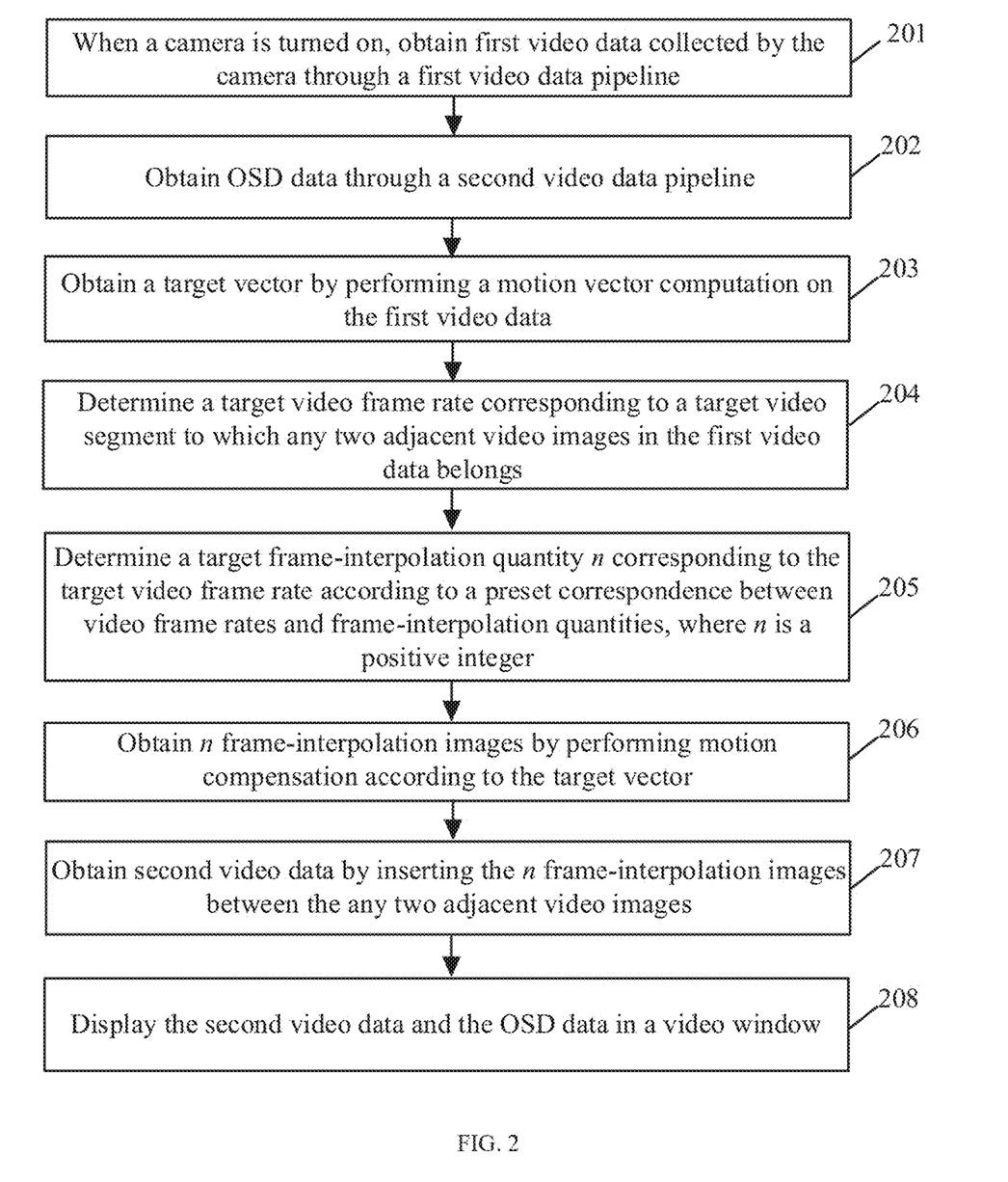
FIG. 2 is a schematic flowchart illustrating a method for frame interpolation provided in implementations of the disclosure.

Consistent with the foregoing implementations described with reference to FIG. 1B, referring to FIG. 2, FIG. 2 is a schematic flowchart illustrating a method for frame interpolation provided in implementations of the disclosure. The method is applied to the electronic device illustrated in FIG. 1A, where the electronic device includes a camera. As illustrated in FIG. 2, the method for frame interpolation includes the following.

201, when the camera is turned on, first video data collected by the camera is obtained through a first video data pipeline.

202, OSD data is obtained through a second video data pipeline.

203, a motion vector computation is performed on the first video data to obtain a target vector.

204, a target video frame rate corresponding to a target video segment to which any two adjacent video images in the first video data belongs is determined.

205, a target frame-interpolation quantity n corresponding to the target video frame rate is determined according to a preset correspondence between video frame rates and frame-interpolation quantities, where n is a positive integer.

206, motion compensation is performed according to the target vector to obtain n frame-interpolation images.

207, the n frame-interpolation images are inserted between the any two adjacent video images to obtain second video data.

208, the second video data and the OSD data are displayed in a video window.

For details of the operations 201-208, reference may be made to the corresponding operations of the method for frame interpolation described in FIG. 1B, which will not be repeated herein.

As can be seen, according to the method for frame interpolation of implementations of the disclosure, the first video data and the OSD data can be obtained through two video data pipelines respectively, and on the other hand, frame interpolation can be performed only on the first video data. As such, smoothness of video pictures can be improved, and introduction of a negative display effect caused by the OSD data can be avoided.

Figure 3:
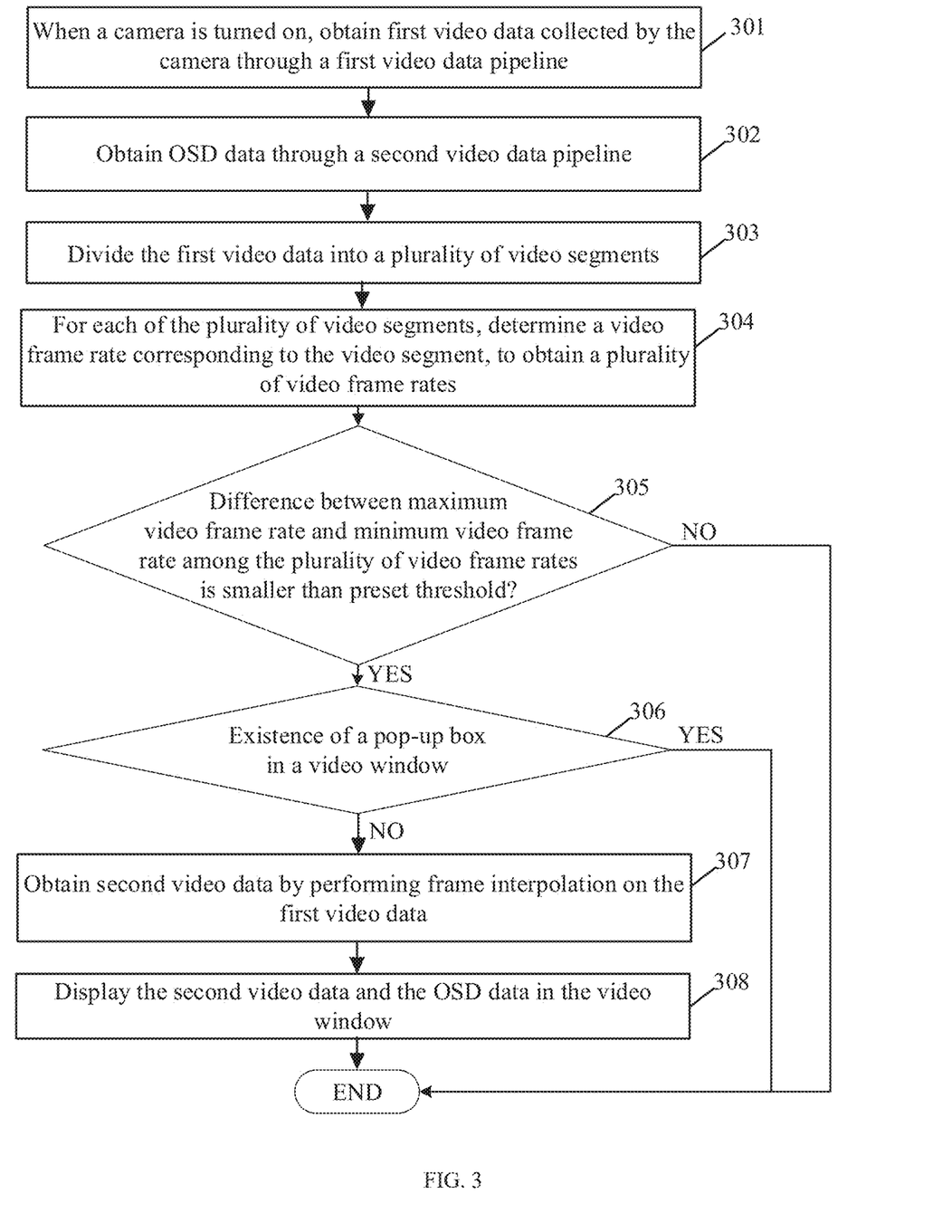
FIG. 3 is a schematic flowchart illustrating another method for frame interpolation provided in implementations of the disclosure.

Consistent with the foregoing implementations described with reference to FIG. 1B, referring to FIG. 3, FIG. 3 is a schematic flowchart illustrating a method for frame interpolation provided in implementations of the disclosure. The method is applied to the electronic device illustrated in FIG. 1A, where the electronic device includes a camera. As illustrated in FIG. 3, the method for frame interpolation includes the following.

301, when the camera is turned on, first video data collected by the camera is obtained through a first video data pipeline.

302, OSD data is obtained through a second video data pipeline.

303, the first video data is divided into multiple video segments.

304, for each of the multiple video segments, a video frame rate corresponding to the video segment is determined, to obtain multiple video frame rates.

305, whether a difference between a maximum video frame rate and a minimum video frame rate among the multiple video frame rates is smaller than a preset threshold is detected.

306, if the difference is smaller than the preset threshold, detect existence of a pop-up box in a video window.

307, in response to absence of the pop-up box in the video window, frame interpolation is performed on the first video data to obtain second video data.

308, the second video data and the OSD data are displayed in the video window.

For details of the operations 301-308, reference may be made to the corresponding operations of the method for frame interpolation described in FIG. 1B, which will not be repeated herein.

As can be seen, according to the method for frame interpolation of implementations of the disclosure, the video frame rate of the first video data is detected first, and existence of the pop-up box is further detected if the video frame rate is stable. In response to absence of the pop-up box, perform video frame interpolation. As such, an effect of the video frame interpolation can be ensured, smoothness of video pictures can be improved, and it is ensured that the effect of the video frame interpolation is not affected by the pop-up box, the OSD data, or the video frame rate.

Figure 4:
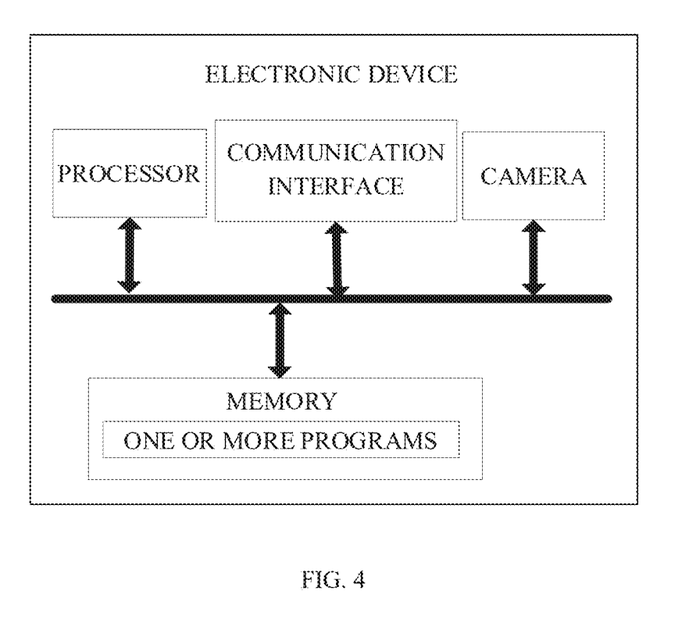
FIG. 4 is a schematic structural diagram illustrating another electronic device provided in implementations of the disclosure.

Consistent with the foregoing implementations, referring to FIG. 4, FIG. 4 is a schematic structural diagram illustrating an electronic device provided in implementations of the disclosure. As illustrated in FIG. 4, the electronic device includes a processor, a camera, a memory, a communication interface, and one or more programs. The programs are stored in the memory described above and configured to be executed by the processor. In implementations of the disclosure, the programs include instructions which are operable to execute the following operations. OSD data and first video data collected by the camera are obtained when the camera is turned on. Frame interpolation is performed on the first video data to obtain second video data. The second video data and the OSD data are displayed in a video window.

As can be seen, the electronic device (including the camera) of implementations of the disclosure obtains the OSD data and the first video data collected by the camera are obtained when the camera is turned on, performs frame interpolation on the first video data to obtain the second video data, and displays the second video data and the OSD data in the video window. As such, frame interpolation is performed on the first video data, which can improve smoothness of video pictures and avoid introduction of a negative display effect caused by the OSD data.

In a possible example, in terms of obtaining the OSD data and the first video data collected by the camera, the instructions of the programs are operable to execute the following operations. The first video data collected by the camera is obtained through a first video data pipeline. The OSD data is obtained through a second video data pipeline.

In a possible example, in terms of performing frame interpolation on the first video data to obtain the second video data, the instructions of the programs are operable to execute the following operations. On condition that first attribute information of the first video data satisfies a first preset condition, frame interpolation is performed on the first video data to obtain the second video data. In terms of displaying the second video data and the OSD data in the video window, the instructions of the programs are operable to execute the following operations. On condition that second attribute information of the OSD data satisfies a second preset condition, the second video data and the OSD data are displayed in the video window.

In a possible example, the instructions of the programs are further operable to execute the following operations. On condition that a first layer name is a video layer or a first layer format is a YUV format, determine that the first attribute information of the first video data satisfies the first preset condition. On condition that a second layer name is an OSD layer or a second layer format is an RGB format, determine that the second attribute information of the OSD data satisfies the second preset condition.

In a possible example, in terms of performing frame interpolation on the first video data to obtain the second video data, the instructions of the programs are operable to execute the following operations. A motion vector computation is performed on the first video data to obtain a target vector. Frame interpolation is performed on the first video data according to the target vector to obtain the second video data.

In a possible example, in terms of performing the motion vector computation on the first video data to obtain the target vector, the instructions of the programs are operable to execute the following operations. Motion detection is performed on the first video data to obtain multiple motion detection points. For each of the multiple motion detection points, a point motion vector of the motion detection point is obtained, to obtain multiple point motion vectors. On condition that the multiple point motion vectors are the same, any of the point motion vectors is determined as the target vector.

In a possible example, in terms of performing frame interpolation on the first video data according to the target vector to obtain the second video data, the instructions of the programs are operable to execute the following operations. A target video frame rate corresponding to a target video segment to which any two adjacent video images in the first video data belongs is determined. A target frame-interpolation quantity n corresponding to the target video frame rate is determined according to a preset correspondence between video frame rates and frame-interpolation quantities, where n is a positive integer. Motion compensation is performed according to the target vector to obtain n frame-interpolation images. The n frame-interpolation images are inserted between the any two adjacent video images to obtain the second video data.

In a possible example, the instructions of the programs are further operable to execute the following operations. The first video data is divided into multiple video segments. For each of the multiple video segments, a video frame rate corresponding to the video segment is determined, to obtain multiple video frame rates. In terms of performing frame interpolation on the first video data to obtain the second video data, the instructions of the programs are operable to execute the following operations. On condition that a difference between a maximum video frame rate and a minimum video frame rate among the multiple video frame rates is smaller than a preset threshold, frame interpolation is performed on the first video data.

In a possible example, the instructions of the programs are further operable to detect existence of a pop-up box in the video window. In terms of performing frame interpolation on the first video data to obtain the second video data, the instructions of the programs are operable to execute the following operations. In response to absence of the pop-up box in the video window, frame interpolation is performed on the first video data.

In a possible example, the instructions of the programs are further operable to execute the following operations. The first video data is divided into multiple video segments. For each of the multiple video segments, a video frame rate corresponding to the video segment is determined, to obtain multiple video frame rates. On condition that a difference between a maximum video frame rate and a minimum video frame rate among the multiple video frame rates is smaller than a preset threshold, detect existence of a pop-up box in the video window. In terms of performing frame interpolation on the first video data to obtain the second video data, the instructions of the programs are operable to execute the following operations. In response to absence of the pop-up box in the video window, frame interpolation is performed on the first video data.

The foregoing technical solutions of the implementations of the disclosure are mainly described from the viewpoint of execution of the method. It can be understood that, in order to implement the above functions, the electronic device includes hardware structures and/or software modules corresponding to the respective functions. Those skilled in the art should readily recognize that, in combination with exemplary units and scheme steps or operations described in the implementations disclosed herein, the disclosure can be implemented in hardware or a combination of hardware and computer software. Whether a function is implemented by way of hardware or computer software driving hardware depends on the particular application and design constraints of the technical solutions. Those skilled in the art may use different methods to implement the described functions for each particular application, but such implementation should not be considered as beyond the scope of the disclosure.

According to the implementations of the disclosure, functional units may be divided for the electronic device in accordance with the foregoing method examples. For example, functional units may be divided according to corresponding functions, and two or more functions may be integrated into one processing unit. The above-mentioned integrated unit can be implemented in the form of hardware or software functional units. It should be noted that the division of units in the implementations of the disclosure is schematic and is merely a logical function division; there may be other division manners in actual implementation.

Figure 5:
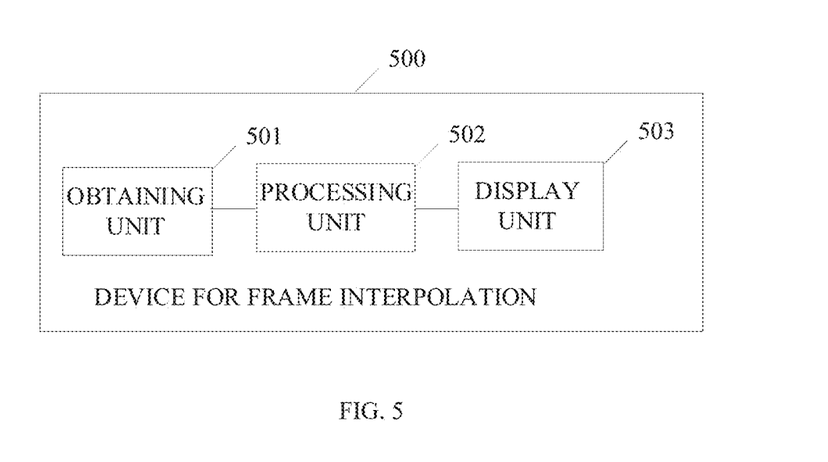
FIG. 5 is a block diagram illustrating functional units of a device for frame interpolation provided in implementations of the disclosure.

FIG. 5 is a block diagram illustrating functional units of a device 500 for frame interpolation provided in implementations of the disclosure. The device 500 for frame interpolation is applied to an electronic device, where the electronic device includes a camera. The device 500 includes an obtaining unit 501, a processing unit 502, and a display unit 503. The obtaining unit 501 is configured to obtain OSD data and first video data collected by the camera when the camera is turned on. The processing unit 502 is configured to perform frame interpolation on the first video data to obtain second video data. The display unit 503 is configured to display the second video data and the OSD data in a video window.

As can be seen, according to the device for frame interpolation described in implementations of the disclosure, where the device for frame interpolation is applied to an electronic device including a camera, the OSD data and the first video data collected by the camera are obtained when the camera is turned on; frame interpolation is performed on the first video data to obtain the second video data; the second video data and the OSD data are displayed in the video window. As such, frame interpolation is performed on the first video data, which can improve smoothness of video pictures and avoid introduction of a negative display effect caused by the OSD data.

In a possible example, the obtaining unit 501 configured to obtain the OSD data and the first video data collected by the camera is specifically configured to: obtain the first video data collected by the camera through a first video data pipeline; and obtain the OSD data through a second video data pipeline.

In a possible example, the processing unit 502 is further configured to perform frame interpolation on the first video data to obtain the second video data, on condition that first attribute information of the first video data satisfies a first preset condition. The display unit 503 is further configured to display the second video data and the OSD data in the video window, on condition that second attribute information of the OSD data satisfies a second preset condition.

In a possible example, the first attribute information includes a first layer name and a first layer format, the second attribute information includes a second layer name and a second layer format, and the processing unit 502 is further configured to: determine that the first attribute information of the first video data satisfies the first preset condition, on condition that the first layer name is a video layer or the first layer format is a YUV format; and determine that the second attribute information of the OSD data satisfies the second preset condition, on condition that the second layer name is an OSD layer or the second layer format is an RGB format.

In a possible example, the processing unit 502 configured to perform frame interpolation on the first video data to obtain the second video data is specifically configured to: perform a motion vector computation on the first video data to obtain a target vector; and perform frame interpolation on the first video data according to the target vector to obtain the second video data.

In a possible example, the processing unit 502 configured to perform the motion vector computation on the first video data to obtain the target vector is specifically configured to: perform motion detection on the first video data to obtain multiple motion detection points; for each of the multiple motion detection points, obtain a point motion vector of the motion detection point, to obtain multiple point motion vectors; and determine any of the point motion vectors as the target vector, on condition that the multiple point motion vectors are the same.

In a possible example, the processing unit 502 configured to perform frame interpolation on the first video data according to the target vector to obtain the second video data is specifically configured to: determine a target video frame rate corresponding to a target video segment to which any two adjacent video images in the first video data belongs; determine a target frame-interpolation quantity n corresponding to the target video frame rate according to a preset correspondence between video frame rates and frame-interpolation quantities, where n is a positive integer; perform motion compensation according to the target vector to obtain n frame-interpolation images; and insert the n frame-interpolation images between the any two adjacent video images to obtain the second video data.

In a possible example, the processing unit 502 is further configured to: divide the first video data into multiple video segments; for each of the multiple video segments, determine a video frame rate corresponding to the video segment, to obtain multiple video frame rates; and perform frame interpolation on the first video data, on condition that a difference between a maximum video frame rate and a minimum video frame rate among the multiple video frame rates is smaller than a preset threshold.

In a possible example, the processing unit 502 is further configured to: detect existence of a pop-up box in the video window; and perform frame interpolation on the first video data, in response to absence of the pop-up box in the video window.

It can be understood that, a function of each program module of the device for frame interpolation of implementations can be implemented according to the method of the foregoing method implementations, and a specific implementation process can refer to the relevant descriptions of the foregoing method implementations, which will not be repeated herein.

Implementations of the disclosure further provide a non-transitory computer-readable storage medium. The non-transitory computer-readable storage medium stores computer programs for electronic data interchange. The computer programs are operable with a computer to execute all or part of the operations of the method described in the foregoing method implementations. The "Computer" referred to herein includes an electronic device.

Implementations of the disclosure further provide a computer program product. The computer program product includes a non-transitory computer-readable storage medium configured to store computer programs. The computer programs are operable with a computer to execute all or part of the operations of the method described in the foregoing method implementations. The computer program product may be a software installation package. The "Computer" referred to herein includes an electronic device.

It is to be noted that, for the sake of simplicity, the foregoing method implementations are described as a series of action combinations, however, it will be appreciated by those skilled in the art that the disclosure is not limited by the sequence of actions described. That is because that, according to the disclosure, certain steps or operations may be performed in other order or simultaneously. Besides, it will be appreciated by those skilled in the art that the implementations described in the specification are exemplary implementations, and the actions and modules involved are not necessarily essential to the disclosure.

In the foregoing implementations, the description of each implementation has its own emphasis. For the parts not described in detail in one implementation, reference may be made to related descriptions in other implementations.

In the implementations of the disclosure, it should be understood that, the device disclosed in implementations provided herein may be implemented in other manners. For example, the device/apparatus implementations described above are merely illustrative; for instance, the division of the unit is only a logical function division and there can be other manners of division during actual implementations, for example, multiple units or assemblies may be combined or may be integrated into another system, or some features may be ignored, omitted, or not performed. In addition, coupling or communication connection between each illustrated or discussed component may be direct coupling or communication connection, or may be indirect coupling or communication among devices or units via some interfaces, and may be electrical connection or other forms of connection.

The units described as separate components may or may not be physically separated, the components illustrated as units may or may not be physical units, that is, they may be in the same place or may be distributed to multiple network elements. Part or all of the units may be selected according to actual needs to achieve the purpose of the technical solutions of the implementations.

In addition, the functional units in various implementations of the disclosure may be integrated into one processing unit, or each unit may be physically present, or two or more units may be integrated into one unit. The above-mentioned integrated unit can be implemented in the form of hardware or a software function unit.

The integrated unit may be stored in a computer readable memory when it is implemented in the form of a software functional unit and is sold or used as a separate product. Based on such understanding, the technical solutions of the disclosure essentially, or the part of the technical solutions that contributes to the related art, or all or part of the technical solutions, may be embodied in the form of a software product which is stored in a memory and includes instructions for causing a computer device (which may be a personal computer, a server, or a network device and so on) to perform all or part of the operations of the method described in the various implementations of the disclosure. The memory includes various medium capable of storing program codes, such as a universal serial bus (USB), a read-only memory (ROM), a RAM, a removable hard disk, Disk, compact disc (CD), or the like.

It will be understood by those of ordinary skill in the art that all or part of the operations of the method of the implementations described above may be accomplished by means of a program to instruct associated hardware, the program may be stored in a computer-readable memory, which may include a flash memory, a ROM, a RAM, Disk or CD, and so on.

While the implementations of the disclosure are described in detail above, the principles and implementations of the disclosure are described in connection with illustrative implementations, it is to be understood that foregoing implementations are merely used to help understand the method and the core idea of the disclosure. As will occur to those skilled in the art, the disclosure is susceptible to various modifications and changes without departing from the spirit and principle of the disclosure. Therefore, the disclosure is not to be limited to the disclosed implementations.

What is claimed is:

1. A method for frame interpolation, applied to an electronic device comprising a camera, the method comprising:
    obtaining on-screen display (OSD) data and first video data collected by the camera;
    dividing the first video data into a plurality of video segments;
    for each of the plurality of video segments, determining a video frame rate corresponding to the video segment, to obtain a plurality of video frame rates;
    obtaining second video data by performing frame interpolation on the first video data; and
    displaying the second video data and the OSD data in a video window;
    wherein obtaining the second video data by performing frame interpolation on the first video data comprises:
        obtaining the second video data by performing frame interpolation on the first video data, in response to a difference between a maximum video frame rate and a minimum video frame rate among the plurality of video frame rates being smaller than a preset threshold.

2. The method of claim 1, wherein obtaining the OSD data and the first video data collected by the camera comprises:
    obtaining the first video data collected by the camera through a first video data pipeline; and
    obtaining the OSD data through a second video data pipeline.

3. The method of claim 1, wherein obtaining the second video data by performing frame interpolation on the first video data comprises:

obtaining the second video data by performing frame interpolation on the first video data, on condition that first attribute information of the first video data satisfies a first preset condition; and wherein displaying the second video data and the OSD data in the video window comprises:

displaying the second video data and the OSD data in the video window, on condition that second attribute information of the OSD data satisfies a second preset condition.

4. The method of claim 3, wherein the first attribute information comprises a first layer name and a first layer format, the second attribute information comprises a second layer name and a second layer format, and the method further comprises:

determining that the first attribute information of the first video data satisfies the first preset condition, on condition that the first layer name is a video layer or the first layer format is a YUV format; and determining that the second attribute information of the OSD data satisfies the second preset condition, on condition that the second layer name is an OSD layer or the second layer format is an RGB format.

5. The method of claim 1, wherein obtaining the second video data by performing frame interpolation on the first video data comprises:

obtaining a target vector by performing a motion vector computation on the first video data; and obtaining the second video data by performing frame interpolation on the first video data according to the target vector.

6. The method of claim 5, wherein obtaining the target vector by performing the motion vector computation on the first video data comprises:

obtaining a plurality of motion detection points by performing motion detection on the first video data;

for each of the plurality of motion detection points, obtaining a point motion vector of the motion detection point, to obtain a plurality of point motion vectors; and determining any of the point motion vectors as the target vector, on condition that the plurality of point motion vectors are the same.

7. The method of claim 5, wherein obtaining the second video data by performing frame interpolation on the first video data according to the target vector comprises:

determining a target video frame rate corresponding to a target video segment to which any two adjacent video images in the first video data belongs;

determining a target frame-interpolation quantity n corresponding to the target video frame rate according to a preset correspondence between video frame rates and frame-interpolation quantities, wherein n is a positive integer;

obtaining n frame-interpolation images by performing motion compensation according to the target vector; and obtaining the second video data by inserting the n frame-interpolation images between the any two adjacent video images.

8. An electronic device, comprising:

a camera, a display screen, and a chip for frame interpolation coupled with the camera and the display screen, and the chip for frame interpolation being configured to:

obtain on-screen display (OSD) data and first video data collected by the camera;

detect existence of a pop-up box in the video window;

obtain second video data by performing frame interpolation on the first video data; and control the second video data and the OSD data to be displayed in a video window of the display screen;

wherein the chip for frame interpolation configured to obtain the second video data by performing frame interpolation on the first video data is configured to:

obtain the second video data by performing frame interpolation on the first video data, in response to absence of the pop-up box in the video window.

9. The electronic device of claim 8, wherein the chip for frame interpolation configured to obtain the OSD data and the first video data collected by the camera is configured to:

obtain the first video data collected by the camera through a first video data pipeline; and obtain the OSD data through a second video data pipeline.

10. The electronic device of claim 8, wherein:

the chip for frame interpolation configured to obtain the second video data by performing frame interpolation on the first video data is configured to:

obtain the second video data by performing frame interpolation on the first video data, on condition that first attribute information of the first video data satisfies a first preset condition; and the chip for frame interpolation configured to control the second video data and the OSD data to be displayed in the video window of the display screen is configured to:

control the second video data and the OSD data to be displayed in the video window of the display screen, on condition that second attribute information of the OSD data satisfies a second preset condition.

11. The electronic device of claim 10, wherein the first attribute information comprises a first layer name and a first layer format, the second attribute information comprises a second layer name and a second layer format, and the chip for frame interpolation is further configured to:

determine that the first attribute information of the first video data satisfies the first preset condition, on condition that the first layer name is a video layer or the first layer format is a YUV format; and determine that the second attribute information of the OSD data satisfies the second preset condition, on condition that the second layer name is an OSD layer or the second layer format is an RGB format.

12. The electronic device of claim 8, wherein the chip for frame interpolation configured to obtain the second video data by performing frame interpolation on the first video data is configured to:

obtain a target vector by performing a motion vector computation on the first video data; and obtain the second video data by performing frame interpolation on the first video data according to the target vector.

13. The electronic device of claim 12, wherein the chip for frame interpolation configured to obtain the target vector by performing the motion vector computation on the first video data is configured to:

obtain a plurality of motion detection points by performing motion detection on the first video data;

for each of the plurality of motion detection points, obtain a point motion vector of the motion detection point, to obtain a plurality of point motion vectors; and determine any of the point motion vectors as the target vector, on condition that the plurality of point motion vectors are the same.

14. The electronic device of claim 12, wherein the chip for frame interpolation configured to obtain the second video data by performing frame interpolation on the first video data according to the target vector is configured to:
- determine a target video frame rate corresponding to a target video segment to which any two adjacent video images in the first video data belongs;
- determine a target frame-interpolation quantity n corresponding to the target video frame rate according to a preset correspondence between video frame rates and frame-interpolation quantities, wherein n is a positive integer;
- obtain n frame-interpolation images by performing motion compensation according to the target vector; and
- obtain the second video data by inserting the n frame-interpolation images between the any two adjacent video images.

15. A non-transitory computer-readable storage medium storing computer programs, the computer programs comprising program instructions which, when executed by a processor, cause the processor to carry out actions, comprising:
- obtaining on-screen display (OSD) data and first video data collected by a camera;
- dividing the first video data into a plurality of video segments;
- for each of the plurality of video segments, determining a video frame rate corresponding to the video segment, to obtain a plurality of video frame rates;
- detecting existence of a pop-up box in the video window, in response to a difference between a maximum video frame rate and a minimum video frame rate among the plurality of video frame rates being smaller than a preset threshold;
- obtaining second video data by performing frame interpolation on the first video data; and
- displaying the second video data and the OSD data in a video window;
- wherein the program instructions causing the processor to carry out actions of obtaining the second video data by performing frame interpolation on the first video data cause the processor to carry out actions, comprising:
  - obtaining the second video data by performing frame interpolation on the first video data, in response to absence of the pop-up box in the video window.

16. The non-transitory computer-readable storage medium of claim 15, wherein the program instructions causing the processor to carry out actions of obtaining the second video data by performing frame interpolation on the first video data cause the processor to carry out actions, comprising:
- obtaining a target vector by performing a motion vector computation on the first video data; and
- obtaining the second video data by performing frame interpolation on the first video data according to the target vector.

17. The non-transitory computer-readable storage medium of claim 16, wherein the program instructions causing the processor to carry out actions of obtaining the target vector by performing the motion vector computation on the first video data cause the processor to carry out actions, comprising:
- obtaining a plurality of motion detection points by performing motion detection on the first video data;
- for each of the plurality of motion detection points, obtaining a point motion vector of the motion detection point, to obtain a plurality of point motion vectors; and
- determining any of the point motion vectors as the target vector, on condition that the plurality of point motion vectors are the same.

18. The non-transitory computer-readable storage medium of claim 16, wherein the program instructions causing the processor to carry out actions of obtaining the second video data by performing frame interpolation on the first video data according to the target vector cause the processor to carry out actions, comprising:
- determining a target video frame rate corresponding to a target video segment to which any two adjacent video images in the first video data belongs;
- determining a target frame-interpolation quantity n corresponding to the target video frame rate according to a preset correspondence between video frame rates and frame-interpolation quantities, wherein n is a positive integer;
- obtaining n frame-interpolation images by performing motion compensation according to the target vector; and
- obtaining the second video data by inserting the n frame-interpolation images between the any two adjacent video images.

19. The non-transitory computer-readable storage medium of claim 15, wherein the program instructions causing the processor to carry out actions of obtaining the OSD data and the first video data collected by the camera cause the processor to carry out actions, comprising:
- obtaining the first video data collected by the camera through a first video data pipeline; and
- obtaining the OSD data through a second video data pipeline.

20. The non-transitory computer-readable storage medium of claim 15, wherein the program instructions causing the processor to carry out actions of obtaining the second video data by performing frame interpolation on the first video data cause the processor to carry out actions, comprising:
- obtaining the second video data by performing frame interpolation on the first video data, on condition that first attribute information of the first video data satisfies a first preset condition; and
- wherein the program instructions causing the processor to carry out actions of displaying the second video data and the OSD data in the video window cause the processor to carry out actions, comprising:
  - displaying the second video data and the OSD data in the video window, on condition that second attribute information of the OSD data satisfies a second preset condition.

* * * * *